March 10, 1970 M. K. VOSBURY 3,500,332

CURVE GENERATOR FOR OSCILLOGRAPHIC DISPLAY

Filed Feb. 10, 1967 2 Sheets-Sheet 1

INVENTOR
MICHAEL K. VOSBURY

BY

ATTORNEY

INVENTOR
MICHAEL K. VOSBURY
BY [signature]
ATTORNEY

United States Patent Office
3,500,332
Patented Mar. 10, 1970

3,500,332

CURVE GENERATOR FOR OSCILLOGRAPHIC DISPLAY

Michael K. Vosbury, Nashua, N.H., assignor to Sanders Associates, Inc., Nashua, N.H., a corporation of Delaware Filed Feb. 10, 1967, Ser. No. 615,094
Int. Cl. G11b *13/00;* G08b *23/00*
U.S. Cl. 340—172.5 27 Claims

ABSTRACT OF THE DISCLOSURE

A curve generator includes a reference voltage generator which develops a pair of reference signals which sweep with time between maximum and minimum values. A pair of digital-to-analog converters modify these reference signals in accordance with the initial and terminal coordinates of each segment of a line to be traced so as to develop a pair of electrical analogs of these coordinates which vary with time between maximum and minimum values. The electrical analogs are then summed to provide a single time-varying deflection signal which is applied to a symbol tracer. The symbol tracer in turn traces the line segment in response to the deflection signal.

This invention relates to a curve generator for generating vectors and curved lines and symbols in an electronic display system.

The display system of which my invention forms a part displays recorded data on a display surface such as a cathode ray screen. Usually, the data is recorded in a computer memory or other digital storage device which is updated so that the display is kept current. Thus, for example, the system may give a presentation of current aircraft arrival and departure times, or it may display the status of airline ticket reservations. In another application, the system displays aircraft positions, courses and speeds to an air controller. As such, it must be able to generate a large variety of symbols such as vectors, curves and the like.

In these display systems, the generation of symbols is often accomplished by tracing a succession of short straight lines or vectors which together form the symbol. The coordinates of these vectors are stored as digits in a computer memory. The usual technique for generating each vector is to develop analog voltages proportional to the differences between the initial and terminal X coordinates and the initial and terminal Y coordinates of the vector, and then to integrate these voltages to obtain a pair of time-varying X and Y deflection currents. The deflection currents drive the X and Y deflection windings of a cathode ray tube to trace the vector on the screen.

This technique has several disadvantages, however. First of all, it requires complicated circuit elements. For example, very good integrators are required to obtain tolerable accuracy. Also, many adjustments are required to keep the conventional curve generator in proper operating condition. Generators employing integrators are further disadvantaged in that the integrators induce transients in the cathode ray tube yoke which distort the lines and symbols being displayed. Moreover, even with good integrators the positional accuracy of the ends of the vectors is relatively poor. Consequently, symbols formed by arranging such vectors end-to-end may not close in the desired fashion.

This invention aims to provide an improved curve generator for use in a display system and capable of generating straight, as well as curved, symbols.

Another object of this invention is to provide a curve generator which employs relatively simple electrical components and which requires few adjustments in use.

A still further object of this invention is to provide a curve generator which can be constructed at relatively low cost.

Another object of this invention is to provide a curve generator which can trace straight lines despite nonlinearities in the sweep system.

Another object of this invention is to provide a curve generator which traces symbols that are accurate and have good closure characteristics.

A still further object of this invention is to provide a curve generator capable of generating curved lines and symbols directly.

Another object is to provide a method of tracing symbols which possesses one or more of the aforesaid characteristics.

Other objects of the invention will in part be obvious and will in part appear hereinafter.

The invention, accordingly, comprises the several steps and the relation of one or more of such steps with respect to each of the others and the apparatus embodying the features of construction, combination of elements, and arrangement of parts which are adapted to effect such steps, all as exemplified in the following detailed disclosure; and the scope of the invention will be indicated in the claims:

For a fuller understanding of the nature and objects of the invention, reference should be had to the following detailed description, taken in connection with the accompanying drawings, in which.

Figure 1:
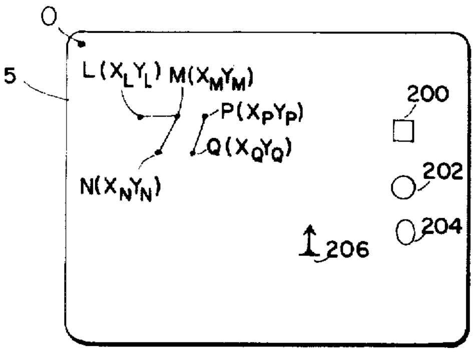
FIG. 1 depicts a cathode ray screen display made in accordance with this invention.

Briefly, my curve generator develops a straight line or vector by sweeping in an analog manner between the two digitally expressed X coordinates, and at the same time between the two digitally expressed Y coordinates, which determine the beginning and end points of the vector. In this way, it produces a pair of time-varying X and Y deflection currents. These currents are applied to the deflection windings of a cathode ray tube and trace the vector on the tube screen.

More particularly, digital instructions representing the initial and terminal X coordinates of the vector are applied to a pair of digitally controlled attenuators. The attenuators attenuate input reference voltages in accordance with the instructions and thereby develop voltage analogs of these coordinates. The reference voltages for the two attenuators are a pair of time-varying voltages. In the case of vector generation, they are complementary ramp voltages, that is, they vary in such manner that their sum is constant.

The reference voltage associated with the initial X coordinate sweeps downward from a maximum value to zero volts. At the same time, the reference voltage associated with the terminal X coordinate sweeps from zero to the same maximum value. The output of the attenuator receiving the initial X coordinate therefore varies between 100% and 0% of the voltage analog of this coordinate. Conversely, the output of the attenuator handling the terminal X coordinate varies between 0% and 100% of the analog voltage of the terminal coordinate.

The generator then sums these time-varying complementary voltage percentages to develop a single X deflection voltage. This deflection voltage varies with time in a linear fashion, from a value comprising 100% of the voltage representing the initial X coordinate and 0% of the voltage representing the terminal X coordinate, all the way to a value comprising 0% of the initial X coordinate voltage and 100% of the terminal X coordinate voltage. When this voltage is used to control the current in the X deflection winding of the cathode ray tube, it moves the electron beam from the initial X coordinate to the terminal X coordinate of the vector.

Using exactly the same technique, the generator develops a time-varying Y deflection voltage which controls the current in the Y deflection winding of the tube. Together, the X and Y deflection voltages give rise to deflection currents which cause the electron beam to trace the desired vector on the tube screen.

As long as the reference voltages applied to the two pairs of attenuators remain complementary as aforesaid, non-linearities and variations in these voltages cancel out. Therefore, such non-linearities do not appreciably affect the output of the curve generator so as to distort the vector being displayed.

When the generator traces a number of adjoining vectors to form a symbol, a routing section therein switches the successive digital X coordinate inputs back and forth between the two X attenuators. These inputs correspond to the terminal X coordinates of the successive vectors making up the curve or symbol. They are routed so that each new input is applied to that attenuator whose reference voltage is zero volts. Thus, initially each new input does not contribute at all to the X deflection voltage. Its contribution increases gradually, however, until it reaches 100%. The same procedure is followed with the successive Y coordinate inputs. This technique minimizes voltage transients which, in prior systems, tend to arise during the transition from one line trace to the next, and which manifest themselves as jumps or gaps between the successive lines in the symbol.

My curve generator is also capable of generating various symbols directly by proper selection of the waveforms of the aforementioned pair of time-varying reference voltages. For example, if these voltages have sinusoidal waveforms, the generator can form circles or ellipses whose eccentricities depend upon the selection of the X and Y coordinate inputs to the attenuators. By properly programming these inputs, it can trace isometric projections, fillets and a variety of other symbols composed of curved and straight lines.

Referring now to the drawings, FIG. 1 shows a frame of data displayed on the screen of a cathode ray tube 5 in accordance with this invention. The display frame is made up of an array of symbols, each of which consists of one or more short vectors arranged relative to one another to form the various straight and curved symbols illustrated here. Normally, such a display frame will consist of many symbols. However, the data depicted in FIG. 1 suffices to show the variety of symbol shapes obtainable with the present system. For clarity and ease of illustration, we will describe the operation of the generator as it traces the number "71" constituting a part of the data displayed on the screen of tube 5. It will be understood, however, that the generation of more complicated display frames embodying many lines, letters and other symbols are but obvious extensions of the simple example with which we deal here.

The number "71" consists of two decimal digits. The first digit "7" is made up of a horizontal vector LM having beginning coordinates $X_L$, $Y_L$ and terminal coordinates $X_M$, $Y_M$, as well as a contiguous oblique vector MN whose terminal coordinates are $X_N$, $Y_N$. The second digit "1" is a separate single vertical vector PQ having beginning coordinates $X_P$, $Y_P$ and terminal coordinates $X_Q$, $Y_Q$.

Figure 2:
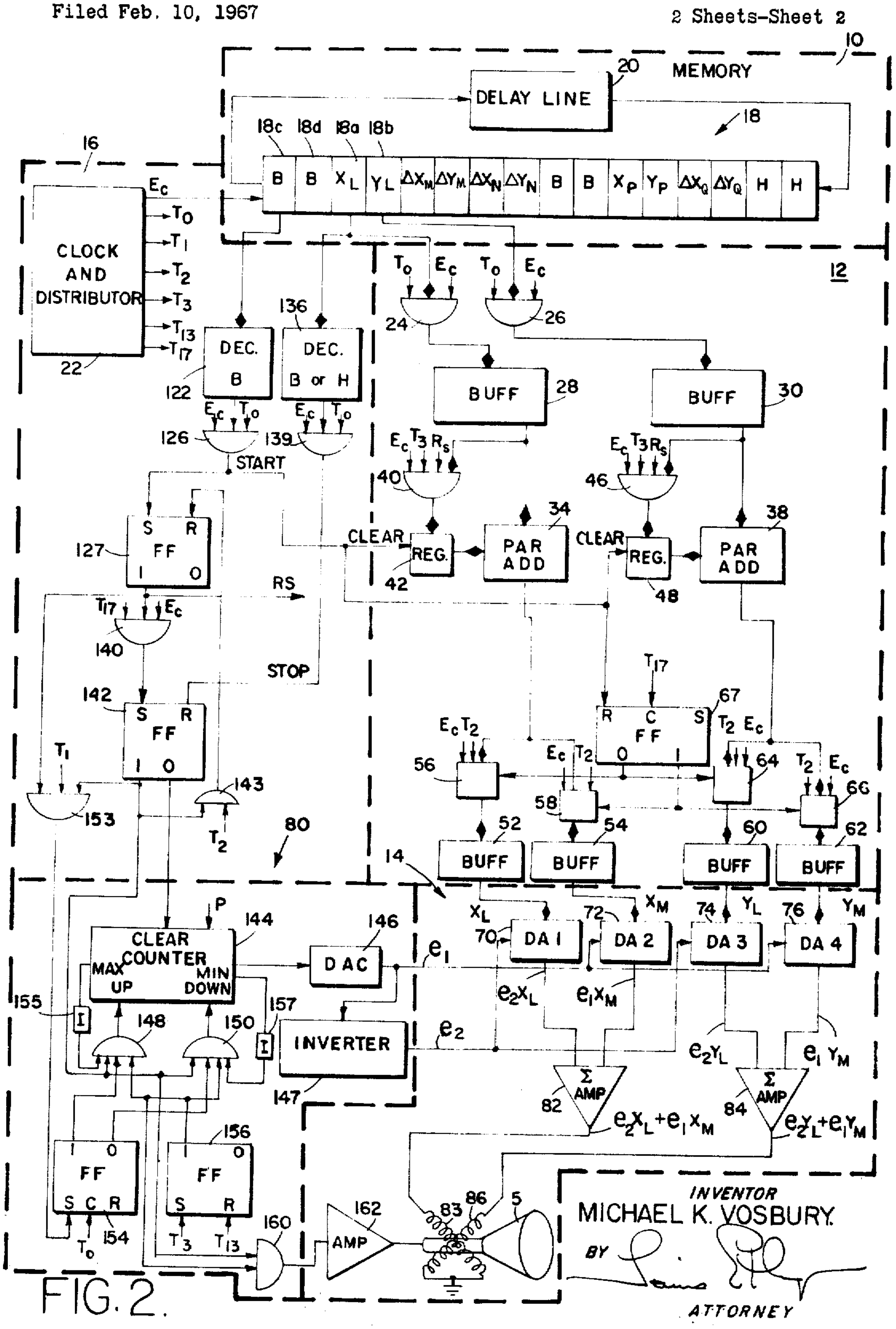
FIG. 2 is a block diagram of a curve generator embodying the principles of my invention.

With reference to FIG. 2, the curve generator comprises a memory 10 which stores in digital word form the instructions for tracing all the lines and symbols in the display frame. The instructions for tracing the successive vectors which make up the symbols in the display are successively read out of memory 10. The portions of the instructions representing the beginning and terminal coordinates of the vectors are fed to a routing section 12 which temporarily stores the coordinates and routes them to the appropriate subunit in a vector generation section 14 in such a way as to minimize jumps and gaps between successive vectors.

The generation section 14 converts the instructions from routing section 12 into analog direct voltages (or currents) representing the beginning and terminal X and Y coordinates of each vector. Then, section 14 attenuates these direct voltages to form two time-varying voltages representing the two X coordinates of the vector and sums complementary percentages of these voltages to develop a single time-varying deflection current. Section 14 also generates a time-varying deflection current in the same fashion. When the two are applied simultaneously to the deflection coils of cathode ray tube 5, they suffice to trace the desired vector on the tube screen. All of the vectors comprising each symbol in the display are traced in this same manner.

Control information is read out of memory 10 into a timing section 16. Section 16 controls the transfer of instructions from memory 10 to vector generation section 14, and also initiates the tracing of each line and symbol in the display frame.

In the illustrated embodiment of my invention, memory 10 is a recirculating type memory comprising a shift register 18 and associated acoustical delay line 20. It has sufficient capacity to store the instructions for tracing each line of each symbol in the display frame. Also, it is connected to an input device (not shown) such as a computer, and is continuously updated to keep the data in the display current. The contents of memory 10 are continuously circulated in a clockwise direction in response to signals ($E_c$) from a clock and distributor 22 in timing section 16, so that the contents are repeatedly displayed on the cathode ray screen. This "refreshes" the display on the tube screen periodically so that it appears continuous to the observer. A refresh rate of 60 Hz. is suitable for this purpose.

The data required for tracing the number "71" are contained in register 18 at the point in time under consideration. It includes bytes representing the beginning and terminal X and Y coordinates of the vectors LM, MN and PQ making up the number "71." These bytes are indicated as divisions in register 18 labeled to correspond with the coordinate designations of points L, M, N, P and Q in FIG. 1. The instructions in register 18 also include a control byte B which initiates operation of the curve generator and signals the beginning of the first vector, to wit, vector LM. The control byte B also signals the beginning of a vector within the same frame which does not adjoin a preceding vector in the frame, i.e., vector PQ. Finally, a control byte H signals the end of the last vector in the frame, i.e., vector PQ in this example, and shuts off the generator until the reappearance of control byte B in register 18.

It should be mentioned at this point also that the illustrated system is programmed so that the stored coordinates of the initial point in each separate line or symbol, i.e., points L and P, are expressed relative to the "origin" O on the tube 5 screen (FIG.1). In a typical case, the origin is located in the upper left-hand corner of the screen. The stored coordinates of the other points in each line or symbol are expressed relative to the initial point thereof. That is, points M and N are expressed relative to point L (e.g., $\Delta X_M$, $\Delta X_N$), and point Q is expressed relative to point P. Accordingly, when tracing the number "71," the relative coordinates of points M and N must be added to or subtracted from those of point L; and the relative coordinates of point Q must be added to those of point P in order to obtain the absolute coordinates of M, N and Q for a proper display on the tube 5 screen.

X and Y coordinate data is read out of memory 10 from the third and fourth sections 18*a* and 18*b* of register 18, while the control information is read out of the first and third stages 18*c* and 18*a* thereof. More specifically, the register sections 18*a* and 18*b* are coupled via sets of gates 24 and 26, respectively, to identical buffer registers 28 and 30, respectively, in routing section 12.

Figure 3:
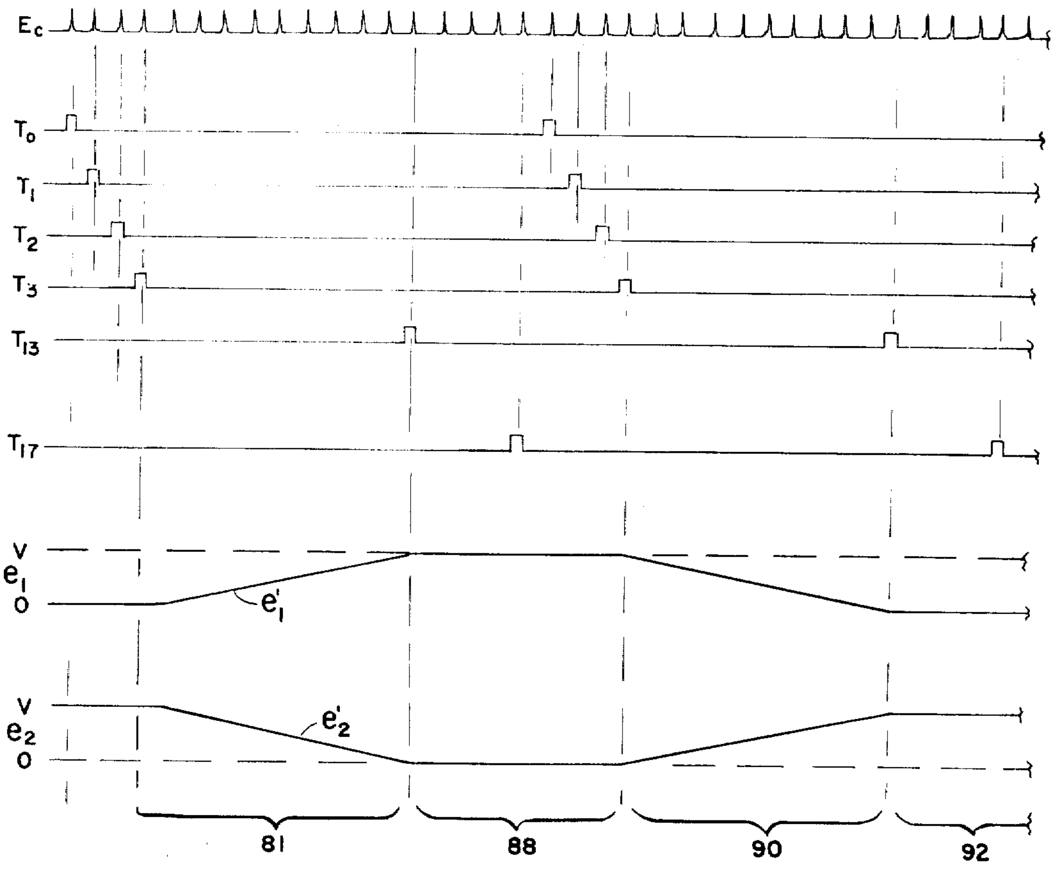
FIG. 3 is a timing diagram illustrating the operating sequence of various elements of the FIG. 2 generator.

A clock and distributor 22 in timing section 16 generates a number of timing signals which control various elements of the system. Reference to FIG. 3 will help the reader to understand the relative timing of these signals. More particularly, clock 22 produces fast timing pulses $E_c$, which synchronize all the elements of the system, and which can also be used in the generation of reference voltages in generation section 14. Each pulse $E_c$ causes the register 18 to shift one stage to the left. Assuming a nine-bit byte length in the memory 10, nine such pulses are required for a byte to shift from one section in register 18 to the next.

Clock 22 also generates timing pulses $T_0$, $T_1$, $T_2$, . . . $T_{17}$ at a submultiple of the $E_c$ pulse rate. In particular, each T pulse occurs once for each passage of a byte through two sections of the register 18, i.e., once for every eighteen $E_c$ pulses. Each T pulse has a duration approximating the period of the $E_c$ pulse. Also, each pulse $T_0$ occurs when the register 18 sections exactly contain the bytes stored in the memory 10. The $T_1$ . . . $T_{17}$ pulses correspond to the successive $E_c$ pulses immediately following the $T_0$ pulse.

Conncidence of $E_c$ pulses with T pulses is used to enable various gates in the system. Thus, when gates 24 and 26 in section 12 are enabled by the coincidence of timing signals $E_c$ and $T_0$, they load the contents of the stages 18*a* and 18*b* of register 18 into registers 28 and 30 respectively. All of the other gates employed in this system receive timing pulses $E_c$ and the various other timing signals from clock 22 and transfer data in this fashion. For clarity, timing signals coupled to the various sets of gates are indicated by short arrows appropriately designated, while the data lines leading to the gates terminate in diamonds. Also, the customary delays are built into the various gates and registers so that data can be read out of each register at the same time new data is loaded into it, avoiding a race problem.

With the foregoing arrangement, the X and Y coordinates stored in memory 10 are read out of the memory in pairs, with each X coordinate, contained in the third stage 18*a* of the register 18 during a given signal $T_0$, being loaded into buffer register 28; and each Y coordinate, contained in the fourth stage 18*b* of register 18, being loaded into buffer register 30. Thus, for example, if the data is contained in register 18 as illustrated in FIG. 2, the $X_L$ and $Y_L$ bytes are contained in register sections 18*a* and 18*b*, respectively. During the next $T_0$ pulse, eighteen pulses later, the $X_L$ and $Y_L$ bytes are in the first and second sections 18*c* and 18*d*, respectively, while the $\Delta X_M$ and $\Delta Y_M$ bytes are in sections 18*a* and 18*b*. Therefore, upon the occurrence of the second signal $T_0$, the $\Delta X_M$ and $\Delta Y_M$ bytes are loaded from stages 18*a* and 18*b* into registers 28 and 30, respectively; and the cycle repeats for the rest of the bytes in the register.

As mentioned previously, the initial coordinates of each separate symbol in the system under consideration, i.e., $X_L$, $Y_L$, and $X_P$, $Y_P$) are expressed with reference to the "origin" O on the display (FIG. 1), whereas succeeding coordinates in the same symbol are expressed with reference to the initial coordinates. Thus, the succeeding coordinate data must be added to the initial coordinates to obtain the absolute coordinates of the succeeding initial and terminating points in the symbol as required for proper display on the screen of tube 5.

Accordingly, the contents of buffer register 28 are applied to one input of a parallel adder 34. Similarly, the contents of register 30 are applied to one input of a parallel adder 38. The contents of buffer register 28 are also applied via gates 40 to an X reference register 42 which is, in turn, coupled to the other input terminal of adder 34. Gates 40 are enabled by the coincidence of the $T_3$ timing signal and a *reference* signal (RS) from timing section 16 whose generation will be described later. The *reference* signal is applied to gates 40 only when the X coordinate byte of the initial point in each symbol, e.g., point L or P (FIG. 1), is contained in register 28. Furthermore, the $T_3$ signal occurs only after the byte has already been routed to section 14, as will be described presently. This is to prevent the X coordinate byte of the initial point in each symbol from being applied to both input terminals of adder 34 and thereby being added to itself.

Similar circuit components are employed to store the initial Y coordinate byte of each separate line or symbol and to add that to the Y coordinate bytes of successive lines making up the same symbol. More particularly, initial coordinates in buffer register 30 are loaded via gates 46 into a Y reference register 48 which is, in turn, coupled to the other input terminal of parallel adder 38. The operation of gates 46 is exactly the same as that of gates 40. Preferably, each coordinate byte following an initial coordinate byte contains a sign bit to which the adder 34 (or 38) responds by adding or subtracting, as the case may be, to provide the desired absolute coordinate.

The adder 34 output is fed to a pair of buffer registers 52 and 54 via sets of gates 56 and 58, respectively. Similarly, the output of adder 38 is fed to a pair of buffer registers 60 and 62 via gates 64 and 66, respectively. The operations of the gates 56, 58, 64 and 66 are such that the initial X and Y coordinate bytes of each separate vector or other symbol in the display are always routed to registers 52 and 60 respectively. Succeeding X coordinate bytes in the same line or symbol, on the other hand, are routed alternately to registers 54 and 52. Similarly, succeeding Y coordinate bytes in the same line or symbol are fed alternately to registers 62 and 60.

To accomplish this, the gates 56, 58, 64 and 66 are controlled by a complementing flip-flop 67. The output from the ZERO terminal of flip-flop 67 enables AND gates 56 and 64, while the output from its ONE terminal enables gates 58 and 66. Operation of these gates is timed by the timing signal $T_2$. The flip-flop 67 is reset by a *start* signal from section 16 when the initial X and Y coordinate bytes (i.e., $X_L$ and $Y_L$) are contained in registers 28 and 30 respectively. The generation of the start signal will be described later. The coincidence of the output from the ZERO terminal of the flip-flop and the $T_2$ signal then enables gates 56 and 64 so that the $X_L$ and $Y_L$ coordinate bytes are applied to registers 52 and 60 respectively. Then, only after these bytes are already contained in registers 52 and 60, the next $T_3$ signal loads them into reference registers 42 and 48, as mentioned previously.

The timing signal $T_{17}$ from clock 22 is applied to the COMPLEMENT terminal of flip-flop 67. This $T_{17}$ signal occurs shortly prior to the next $T_2$ signal controlling gates 56, 58, 64 and 66. The coincidence of the resulting output from the ONE terminal of flip-flop 67 and this next $T_2$ signal therefore enables gates 58 and 66, thereby applying the outputs of adders 34 and 38 (i.e., $X_L+\Delta X_M=X_M$ and $Y_L+\Delta Y_M=Y_M$) to registers 54 and 62, respectively. Similarly, the next $T_{17}$ signal again complements flip-flop 67 so that, upon the occurrence of the succeeding $T_2$ signal, the gates 56 and 64 are again enabled, so that the next succeeding bytes (i.e., $X_L+\Delta X_N=X_N$ and $$Y_L+\Delta Y_N=Y_N)$$

are loaded into registers 52 and 60, respectively. In the general case, this process continues until the last of the succession of coordinates of adjoining vectors has passed through the adders 34 and 38. That is, in the example under discussion, it continues until $X_N$ and $Y_N$ have reached the registers 52 and 60.

Still referring to FIG. 2, the X coordinate data stored in buffer registers 52 and 54 is applied to a pair of digital-to-analog converters 70 and 72, respectively, in line generation section 14. Similarly, the Y coordinate data stored in registers 60 and 62 is coupled to digital-to-analog converters 74 and 76, respectively. The converters 70, 72, 74 and 76 employ time-varying reference voltages, about to be described, in lieu of the fixed reference voltages found in the usual digital-to-analog converters. Accordingly, the output of each converter is not merely a direct voltage analog of the digital input from its corresponding buffer register. Rather, it varies with time in accordance with the reference voltage applied to it.

In the illustrated embodiment of my invention, a reference voltage generator 80 in vector generation section 14 generates a pair of voltages which vary linearly with time. One such voltage $e_1$ is applied as a reference to digital-to-analog converters 72 and 76. The other voltage $e_2$ is a reference for digital-to-analog converters 70 and 74. As seen in FIG. 3, voltages $e_1$ and $e_2$ sweep up and down between zero and +V volts in sch a way as to remain complementary (i.e., so that $e_1+e_2=V$) over the entire sweep. Thus, with a linear sweep, the voltages in the region 81 of FIG. 3 are given by:

$$e_1=kVt \quad (1)$$

and $$e_2=V-kVt \quad (2)$$

where $k$ is a constant and $t$ is the time from the beginning of the sweep.

The output of the converter 70 corresponds to the voltage analog of $X_L$, the X coordinate contained in the register 52; and the output of converter 72 corresponds to the analog of $X_M$, the content of the register 54. These outputs are summed in a summing amplifier 82, an essentially constant current source that drives the horizontal (X) deflection coils 83 of the cathode ray tube 5. Since the reference voltages $e_1$ and $e_2$ for the converters 70 and 72 are varied with time, the sum is a weighted sum.

More specifically, the generator 80 is, in effect, an attenuator that attenuates the primary reference voltage V to provide the reference voltages $e_1$ and $e_2$ employed by the converters 70 and 72. Since the output voltages of the converters 70 and 72 are proportional to these reference voltages, the sum of the digital inputs to the converters is weighted according to $e_1$ and $e_2$. That is, the sum $e_{sx}$ may be expressed as:

$$e_{sx}=e_2X_L+e_1X_M \quad (3)$$

Thus, the voltage $e_{sx}$ comprises the sum of complementary percentages of the voltage analogs of X coordinates $X_L$ and $X_M$ respectively. These percentages change with time as the voltages $e_1$ and $e_2$ sweep as aforesaid. Assume, for example, that initially voltage $e_2$ has its maximum value of +V volts and voltage $e_1$ is zero volts, as in region 81 (FIG. 3). At this point in time, $$e_{sx}=e_2X_L \quad (4)$$

In other words, now the voltage for generating X axis deflection current consists solely of the analog of the byte representing the coordinate $X_L$. Therefore, the electron beam in tube 5 is positioned on the X coordinate $X_L$. As time passes, however, voltage $e_2$ decreases and voltage $e_1$ increases, as seen in FIG. 3. Accordingly, the contribution to $e_{sx}$ from the first term of Equation 3 becomes less and less, while that of the second term increases proportionately. This causes the beam in tube 5 to move from point $X_L$ toward coordinate $X_M$. Thus, when the reference voltages $e_1$ and $e_2$ are halfway along their respective sweeps (i.e., at $e_1'$ and $e_2'$ in FIG. 3), the contributions from each term in Equation 3 are equal, so that the electron beam in tube 5 is positioned halfway between coordinates $X_L$ and $X_M$. This process continues until, finally, when voltage $e_2$ is zero and voltage $e_1$ is +V, $$e_{sx}=VX_M \quad (5)$$

At this point, the deflection current is generated solely by the voltage analog of the byte representing $X_M$. Accordingly, the electron beam in tube 5 is now positioned on coordinate $X_M$.

The Y deflection current is obtained in the same fashion. Thus, the output of digital-to-analog converter 74 is a time-varying voltage ($e_2Y_L$), and the output of digital-to-analog converter 76 is a time-varying voltage ($e_1Y_M$). These two voltages are summed by an amplifier 84. The output of amplifier 84 is a voltage which can be represented as:

$$e_{sy}=e_2Y_L+e_1Y_M \quad (6)$$

which changes linearly with respect to time, varying smoothly between the voltage analogs of $Y_L$ and $Y_M$. Amplifier 84 provides the current for the vertical (Y) deflection coils 86 of cathode ray tube 5.

The linear variation of the voltage $e_{sy}$ from the voltage analog of $Y_L$ to the analog $Y_M$ generates a linear deflection current in vertical deflection coil 86 which moves the beam in tube 5 in a straight line from coordinate $Y_L$ to coordinate $Y_M$ (assuming no horizontal deflection).

Now if the X and Y deflection currents generated by both the voltages $e_{sx}$ and $e_{sy}$ are applied simultaneously to the tube 5 windings, they combine to move the electron beam in a straight line from point ($X_L$, $Y_L$) to point ($X_M$, $Y_M$) and thereby trace vector LM. Similarly, as successive bytes designating the end points of successive vectors are applied to generation section 14 as described above, it generates time-varying voltages which trace the corresponding vectors on the tube 5 screen.

It is a feature of this invention that the vectors traced in this way are straight, even though the reference voltages $e_1$ and $e_2$ may vary non-linearly with time. The reason for this is that as long as these voltages remain complementary as described above, the instantaneous X and Y components of each vector being traced are functions only of the end coordinates of that vector.

This is shown by computing the slope ($de_y/de_x$) of the vector LM traced as above.

In the general case:

$$e_1=\begin{cases}0 & t<0\\ Vf(t) & 0\leq t\leq T\\ V & t>T\end{cases} \quad (7)$$

where $f(t)$ is a continuous function in the interval [0, T] such that $$f(0)=0$$

and $$f(T)=1$$

Since $e_1+e_2=V$, $$e_2=\begin{cases}V & t<0\\ V(1-f(t)) & 0\leq t\leq T\\ 0 & t>T\end{cases} \quad (8)$$

Now, by substituting Equations 7 and 8 in Equations 3 and 6, it is found that $$e_{sx}=\begin{cases}X_LV & t<0\\ X_MVf(t)+X_LV(1-f(t)) & 0\leq t\leq T\\ X_MV & t>T\end{cases} \quad (9)$$

and $$e_{sy}=\begin{cases}Y_LV & t<0\\ Y_MVf(t)+Y_LV(1-f(t)) & 0\leq t\leq T\\ Y_MV & t>T\end{cases} \quad (10)$$

If Equations 9 and 10 are differentiated, it is seen that $$\frac{de_x}{dt}=\begin{cases}0 & t<0\\ V\frac{df(t)}{dt}(X_M-X_L) & 0\leq t\leq T\\ 0 & t>T\end{cases} \quad (11)$$

and $$\frac{de_y}{dt}=\begin{cases}0 & t<0\\ V\frac{df(t)}{dt}(Y_M-Y_L) & 0\leq t\leq T\\ 0 & t>T\end{cases} \quad (12)$$

Therefore, in the interval 81 (FIG. 3), $$\frac{de_y}{de_x}=\frac{Y_M-Y_L}{X_M-X_L} \qquad 0\leq t\leq T \quad (13)$$

We find from Equation 13, therefore, that the slope of the vector is dependent only upon the end coordinates ($X_L$, $Y_L$) and ($X_M$, $Y_M$) of the vector and does not depend on the linearity of $e_1$ or $e_2$, as long as $e_1$ and $e_2$ are complementary. As shown in FIG. 3, the interval 81 is followed by an interval 88 during which the voltages $e_1$ and $e_2$ remain unchanged. During this interval, the system prepares for the generation of the next vector MN, which begins at the end of the interval 88 and continues through an interval 90. During the interval 90, the slopes of $e_1$ and $e_2$ are reversed with respect to the interval 81, so that $e_1$ decreases from V to zero and $e_2$ increases from zero to V.

In the meantime, the buffer register 52 has been loaded with $X_N$ (i.e. $X_L+\Delta X_N$), the terminal X coordinate of the vector MN. Since this next vector adjoins the first vector in the example under discussion, its initial X coordinate is $X_M$, the terminal point of the first vector LM. Therefore, $X_N$ is loaded into the buffer register 52 and then the system commences the voltage sweeps shown in the interval 90 in FIG. 3. Since $e_2$ is zero at the beginning of this interval and $e_1$ equals V, the output of the amplifier 82 at this time is $VX_M$. The voltage sweeps then increase the contribution of $X_N$ to the outputs of the amplifier 82 and decreases the contribution of $X_M$ so that, at the end of the interval 90, the output of the amplifier is $VX_N$. Thus, in the manner described above for the interval 90, the electron beam in the cathode ray tube 5 is linearly shifted from the X coordinate $X_M$ to the X coordinate $X_N$. In the same manner, the Y coordinate is shifted from $Y_M$ to $Y_N$, thereby tracing the vector MN.

It should be noted that, since the content of the buffer register 54 is unchanged during the interval 88, the output of digital-to-analog converter 72 is the same at the end of this interval as at its beginning. Also, since the voltage $e_2$ is zero during the interval 88, the output of the converter 70 remains unchanged during this interval, even though the content of the register 52 is changed. Thus, the position of the electron beam in the tube 5 is the same at the end of the interval 88 as at the beinning thereof. That is, the two adjoining vectors LM and MN are connected precisely at their terminal and initial points, respectively. There is no gap or overlap such as experienced in some prior systems.

In similar fashion, if a third vector adjoining the second vector MN were to be traced on the tube 5, its terminal point would be loaded into the buffer register 54 during a constant voltage interval 92 (FIG. 3) similar to the interval 88. The system would thereupon sweep the voltages $e_1$ and $e_2$ in an interval similar to the interval 81 so that the beam would then move from an initial point having the X coordinate $X_N$ to the new terminal X coordinate in the buffer register 54. This sequence would continue until the string of adjoining vectors were completed.

Referring now to FIGS. 2 and 3, the content of register stage 18$c$ is applied to a decoder 122 in timing section 16. The decoder provides output signals in response to the appearance of the control bytes B in the stage 18$c$. Assume that the bytes contained in register 18 have been shifted to the left by successive pulses $E_c$ as described above until they occupy the positions illustrated in FIG. 2 during an interval $T_0$. The decoder 122 emits a B signal indicating the beginning of a vector display, and the signal is applied to an AND circuit 126. The $E_c$ pulse occurring during $T_0$ is then passed by the AND circuit 126 to provide a *start* pulse clearing the registers 42 and 48 and resetting the flip-flop 67, as well as setting a flip-flop 127. When set, the flip-flop 127 provides the *reference* signal (RS), which partially enables the gates 40 and 46 in the routing section 12.

At the same time, the $T_0$ signal enables gates 24 and 26 so that coordiate bytes $X_L$ and $Y_L$ contained in stages 18$a$ and 18$b$ are loaded into buffer registers 28 and 30 respectively. With registers 42 and 48 cleared, the outputs of the adders 34 and 38 are then $X_L$ and $Y_L$, respectively. With the flip-flop 67 reset, the gates 56 and 64 are enabled during the interval $T_2$ to load these coordinates into the buffer registers 52 and 60.

Next, during the interval $T_3$, the gates 40 and 46 are enabled so as to load $X_L$ and $Y_L$ into the registers 42 and 48. In a manner to be described the flip-flop 127 is reset before the next $T_3$ interval to prevent changes in the contents of the registers 42 and 48 by succeeding bytes passing through the buffer registers 28 and 30.

During the next interval $T_0$, the $\Delta X_M$ and $\Delta Y_M$ bytes will have advanced to register stages 18$a$ and 18$b$. Thus, during this interval they are loaded into the registers 28 and 30. Immediately prior to this interval, the flip-flop 67 is complemented by the $T_{17}$ pulse, and thus, during the $T_2$ interval, the flip-flop 67 enables the gates 58 and 66 to pass the outputs of the adders 34 and 38 at buffer registers 54 and 62. This time, the output of the adder 34 is the sum of the contents of the registers 28 and 42, i.e., $X_M=X_L+\Delta X_M$, the terminal X coordinate of the vector LM. Similarly, the buffer 62 is loaded with $$Y_M=Y_L+\Delta Y_M$$

the terminal Y coordinate of this vector. The reference generator 80 then provides the voltages $e_1$ and $e_2$, causing cathode ray tube 5 to trace the vector LM from the absolute coordinates $X_L$, $Y_L$ to $X_M$, $Y_M$ in the manner described.

The $T_{17}$ pulse following the tracing of the vector LM again complements the flip-flop 67. Then, during the following interval $T_0$, the $\Delta X_N$ and $\Delta Y_N$ bytes are loaded into the buffer registers 28 and 30 from the shift register stages 18$a$ and 18$b$. The outputs of the adders 34 and 38 are now $X_N=X_L+\Delta X_N$ and $Y_N=Y_L+\Delta Y_N$, the terminal coordinates of the vector MN. During the interval $T_2$, the gates 56 and 64 are enabled to load these coordinates into the buffer registers 52 and 60. The vector generation section 14 then traces the vector MN on the screen of the cathode ray tube 5.

During the interval $T_0$ in the next succeeding clock cycle, the next control byte B is contained in the register 18$a$. A decoder 136 connected to this stage thereupon enables an AND circuit 139 to pass an $E_c$ pulse as a *stop* signal. This disables the reference generator 80, and the section 14, in a manner to be described, thereby stopping the generation of vectors by the system.

During the next succeeding interval $T_0$, the control byte B is in the register stage 18$c$. The decoder 122 and AND circuit 126 thereupon provide another set of signals initiating vector generation. Specifically, the registers 42 and 48 are cleared, and the buffer registers 28 and 30 are loaded with the coordinate bytes $X_P$ and $Y_P$, which by this time have reached the register stages 18$a$ and 18$b$. These are the initial coordinates of the vector PQ of FIG. 1, and during the interval $T_2$ of the same clock cycle, they are loaded into the buffer registers 52 and 60. During the following $T_0$ interval, the coordinate bytes $\Delta X_Q$ and $\Delta Y_Q$ are loaded into the registers 28 and 30. The outputs of the adders 34 and 38 are then $X_Q=X_P+\Delta X_Q$ and $Y_Q=Y_P+\Delta Y_Q$, respectively, the absolute terminal coordinates of the vector PQ; and these are loaded into the registers 54 and 62 during the interval $T_2$. The reference generator 80 thereupon provides the signals causing the vector generation section 14 to trace the vector PQ on the screen of the cathode ray tube 5.

At the beginning of the next clock cycle, the H byte indicating the end of the series of symbols will be in register stage 18*a*. The decoder 136 and AND circuit 139 will thereupon emit another *stop* signal, again shutting off the vector generator. Vector generation will not begin again until a B byte again reaches the register stage 18*c*.

The reference generator 80 is controlled by signals from the timing section 16 developed in response to the appearance of the B and H bytes in the register stages 18*a* and 18*c*. Specifically, as noted above, the flip-flop 127 is set by the *start* pulse from the AND circuit 126 during the same clock cycle that the initial coordinates of the first of one or more adjoining vectors are transferred through the registers 28 and 30 to the registers 52 and 60 and also to the registers 42 and 48.

Then, during the last interval $T_{17}$ of the same clock cycle, an AND circuit 140 is enabled by virtue of the set condition of the flip-flop 127 to pass an $E_c$ pulse setting a flip-flop 142. During interval $T_2$ of the next clock cycle, the registers 54 and 62 are loaded with the terminal coordinates of the first vector to be drawn. Also, an AND circuit 143, enabled by the set condition of the flip-flop 142, passes the $T_2$ pulse during this cycle to reset the flip-flop 127 and thereby disable gates 40 and 46 prior to the $T_3$ interval. This prevents alteration of the contents of registers 42 and 48, as noted above.

Additionally, the set condition of flip-flop 142 causes reference generator 80 to provide the voltages $e_1$ and $e_2$ for tracing of this vector during the same clock cycle.

More specifically, the generator 80 preferably includes a counter 144 whose content is applied to a digital-to-analog converter 146. The counter counts pulses P from a clock (not shown) having a frequency substantially higher than that of the clock and distributor 22. Thus, the content of the counter increases or decreases linearly with time, depending on whether it is counting up or down. The output of converter 146 is therefore, is essence, a linearly increasing or decreasing voltage during operation of the counter; and this is the voltage $e_1$ provided by the generator 80. The output of converter 146 is passed through an inverter 147 to provide the voltage $e_2$. It should be noted that the stepwise voltage changes actually provided by the converter 146 and inverter 147 are good approximations of the smooth ramps of FIG. 3.

The counter 144 is controlled by the outputs of a pair of AND circuits 148 and 150 which cause the counter to count up and down, respectively. One input signal for each of these AND circuits is the output of flip-flop 142 when it is in the set condition. The other input signals for AND circuits 148 and 150 are derived as follows.

A $T_1$ pulse is passed by an AND circuit 153 in response to the set condition of both flip-flop 127 and 142. This pulse sets a flip-flop 154. The flip-flop 154 then provides a second input signal for the AND circuit 148. A third input is provided by an inverter 155 whose input is a signal provided by the counter 144 when it contains its maximum count. The $T_3$ pulse during the same clock cycle sets a flip-flop 156 whose output signal completes the inputs for AND circuit 148, thereby enabling counter 144 to begin counting up. The voltage $e_1$ at the output of digital-to-analog converter 146 thus has the general form depicted in interval 81 of FIG. 3.

When the counter 144 reaches its maximum count, the output of inverter 155 ceases, thereby cutting off the output of the AND circuit 148. The counter 144 ceases to count and its content remains constant during the succeeding interval, corresponding interval 88 of FIG. 3. The $T_{13}$ pulse resets the flip-flop 156 to ensure that the counter is off during this interval. The next $T_0$ pulse complements flip-flop 154, thereby removing its signal from AND circuit 148 and applying it to the AND circuit 150. Another input for AND circuit 150 is the output of an inverter 157 that receives a signal from the counter 144 whenever the minimum count, i.e., zero, is contained therein. Thus, when the flip-flop 156 is set by the next $T_3$ signal, the AND circuit 150 applies a *down* control signal to counter 144, and the counter thereupon counts down to provide the voltages $e_1$ and $e_2$ shown in interval 90 of FIG. 3. The counter is then turned off when it reaches its minimum count, and the output of inverter 157 ceases, thereby disabling the AND circuit 150.

In this fashion, the reference generator 80 provides alternately increasing and decreasing voltages $e_1$ and $e_2$, with intervening constant voltage portions during which the contents of the buffer registers 52, 54, 60 and 62 are changed as described above. This operation is stopped by the *stop* signal from AND circuit 139, which resets the flip-flop 142. The output of flip-flop 142 then clears the counter 144.

During the periods when the voltages $e_1$ and $e_2$ are changing, i.e., when the vectors are to be traced on the screen of the cathode ray tube 5, an unblanking signal for the cathode ray tube is provided by an AND circuit 160 via amplifier 162 in response to the coincidence of the set conditions of the flip-flops 142 and 156.

Referring to FIG. 3, if the absolute values of the slopes of the ramp portions of reference voltages $e_1$ and $e_2$ are made inversely proportional to the lengths of the vectors to be drawn, the vectors will be drawn at constant lineal speed and, therefore, have uniform intensity. The slopes may be varied by changing the rate of pulses counted by the counter 144 or by varying the number of stages in the counter. Alternatively, the intensity of the electron beam in the cathode ray tube may be adjusted according to vector length. The length of each vector to be drawn can be computed in any convenient manner. For example, the instructions representing the X and Y coordinates of each vector can be converted to analog voltages and processed in a triangle solver to obtain the necessary length data. A triangle solver well adapted for this operation is disclosed in the copending application of Richard Bouchard, Ser. No. 546,099, filed Apr. 28, 1966, and assigned to the assignee of this application.

Also, it should be appreciated that the functions of the various sections of my line generator can be accomplished by components other than those specifically illustrated herein without changing my basic idea, which is that of gradually shifting from one voltage to another by summing smoothly varying and complementary portions of each voltage. For example, the reference generator 80 can employ two similar digital-to-analog converters, in lieu of the one converter 146 and the inverter 147, to generate the two complementary voltages $e_1$ and $e_2$. The second converter would be connected to the flip-flops in the counter 144 in such manner as to respond to the complement of the number contained in the counter.

In addition, various modifications in the programming of my curve generator can simplify the generation of various straight line shapes. For example, the end X coordinate bytes of a given vector can be applied to generation section 14 upon the occurrence of a set of timing signals $T_0$, $T_1$, $T_2$ . . . $T_{17}$ so as to trace a horizontal line on the screen of tube 5 Then, the next set of such timing signals applies the end Y coordinate bytes of that same vector to generation section 14, so as to trace a vertical line at the end of the aforementioned horizontal line. If this same coordinate data is left in section 14 for two more sets of these signals, the voltages $e_1$ and $e_2$ sweep in the opposite direction from before, so that the same two lines are drawn in reverse, forming a square 200 (FIG. 1). Therefore, various rectangular shapes can be formed by selecting appropriate X and Y coordinate ratios.

While the curve generator specifically illustrated herein is capable of forming symbols composed of an array of vectors, the same principle can be employed to generate curves directly. More specifically, by suitably selecting the waveforms of the reference voltages $e_1$ and $e_2$, it is possible to trace a variety of figures. In this situation, the sum of the voltages $e_1$ and $e_2$ may not always be complementary as described above. For example, if voltages $e_1$ and $e_2$ are orthogonal sinusoids, and the X and Y coordinate bytes applied to generation section 14 are the same, a quadrant of circle 202 (FIG. 1) will be generated. If the X and Y coordinate bytes are appropriately different, a quadrant of ellipse 204 will be generated. Thus, by suitably programming the line generator, a succession of ellipses having different eccentricities can be traced on the screen of tube 5 with the eccentricities gradually varying from zero to some value greater than one and then back again to zero. Tube 5 would thereupon display a rotating circle. Other curved lines can also be generated to create fillets between intersecting straight lines, such as seen in various mechanical drawings. This is illustrated by the symbol 206 on the tube 5 screen (FIG. 1). The same approach may also be used to generate directly various characters from digital inputs.

It will be seen from the foregoing, then, that my curve generator provides a simple yet powerful tool in the conversion of digital data to analog functions. The generator has great flexibility, in that it can generate almost any type of symbol that can be formed by a suitable arrangement of vectors. The technique of sweeping between two digital bytes as described above insures that the end point of each vector in the display is positioned at precisely the proper place on the screen of tube 5. Accordingly, a symbol made up of a very large number of adjoining vectors is properly formed and has good closure characteristics. Also, the various lines and symbols are relatively distortion-free. These improved results are obtained without the need of complicated and expensive integrators found in comparable conventional line generators.

It will thus be seen that the objects set forth above, among those made apparent from the preceding description, are efficiently attained, and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The method for generating symbols for a display comprising the steps of (A) providing first and second instructions representing first and second contiguous symbols, each of said instructions including initial and terminal coordinates;

(B) generating first and second time-varying reference signals;

(C) modifying said first and second reference signals in accordance with the initial and terminal coordinates respectively of said first instruction so as to develop a first pair of time-varying electrical analogs of said first instruction;

(D) combining said first pair of analogs so as to produce a first time-varying deflection signal;

(E) controlling the deflection of a signal tracer in accordance with said first deflection signal;

(F) modifying said first and second reference signals in accordance with the terminal and initial coordinates respectively of said second instruction so as to develop a second pair of time-varying electrical analogs of those instructions;

(G) combining said second pair of analogs so as to produce a second time-varying deflection signal; and (H) controlling the deflection of said signal tracer in accordance with said second deflection signal.

2. The method as defined in claim 1 wherein the reference signals are provided so that (A) they sweep between selected minimum and maximum values, and (B) their algebraic sum is constant over each sweep.

3. The method as defined in claim 2 including the further steps of (A) modifying said reference signals in accordance with said instructions so as to develop a third pair of time-varying electrical analogs of those instructions;

(B) combining said third pair of analogs so as to produce a third time-varying deflection signal;

(C) controlling the deflection of said signal tracer in accordance with said third deflection signal in a direction angled to the direction of deflection resulting from said first deflection signal;

(D) modifying said reference signals in accordance with said instructions so as to develop a fourth pair of time-varying electrical analogs of those instructions;

(E) combining said third pair of analogs so as to produce a fourth time-varying deflection signal; and (F) controlling the deflection of said signal tracer in accordance with said fourth deflection signal in a direction angled to the direction of deflection resulting from said second deflection signal.

4. The method as defined in claim 2

(A) wherein (1) the instructions include the initial and terminal coordinates of two or more adjoining lines;

(2) the reference signals sweep in opposite directions between zero and a selected maximum value each time the complete instruction for tracing one of said lines is provided, and (B) including the additional step of providing the terminal coordinate of each successive adjoining line prior to the beginning of each reference signal sweep, and (C) modifying, with said terminal coordinate, said reference signal whose value is zero prior to the beginning of each sweep.

5. A curve tracer comprising (A) means for providing first and second instructions, corresponding to a first axis, for tracing contiguous symbols, each of said instructions including initial and terminal coordinates wherein the terminal coordinate of said first instruction is the same as the initial coordinate of said second instruction;

(B) means for generating first and second reference signals which sweep with time between maximum and minimum values;

(C) means for modifying said first reference signal by the initial coordinate of said first instruction and for modifying said second reference signal by the terminal coordinate of said first instruction so as to develop a first pair of electrical analogs of said first instruction which vary with time between maximum and minimum values;

(D) switch means coupled to said modifying means so that said second reference signal is modified by the initial coordinate of said second instruction and so that said first reference signal is modified by the terminal coordinate of said second instruction so as to develop a second pair of electrical analogs of said second instruction which vary with time between maximum and minimum values;

(E) means for summing said first pair of analogs so as to provide a first time-varying deflection signal and for successively summing said second pair of analogs so as to provide a second time-varying deflection signal; and (F) means for tracing said contiguous symbols in accordance with said deflection signals, whereby the closure characteristics between contiguous coordinates of said contiguous symbols is improved.

6. A curve tracer as defined in claim 5 wherein said generating means generates linearly varying reference signals.

7. A curve tracer as defined in claim 5 wherein said generating means generates reference signals having different slopes.

8. A curve tracer as defined in claim 5 wherein said generating means generates reference signals (A) which vary linearly with time, and (B) whose algebraic sum is a constant.

9. A curve tracer as defined in claim 8

(A) wherein (1) said generating means generates reference voltages whose minimum value is zero;

(2) said instructions include the initial and terminal coordinates of two or more adjoining lines, and (B) including also means for transferring the terminal coordinates of each successive adjoining line from said instruction providing means to said modifying means prior to the beginning of each reference signal sweep so that it modifies the reference signal whose value is then zero.

10. A curve tracer as defined in claim 5 wherein said reference signal generating means comprises (A) a digital-to-analog converter;

(B) a bidirectional counter, the contents of which are applied as an input to said converter whereby said converter produces an analog voltage which is proportional to said contents; and (C) means for generating a second voltage which varies inversely with said analog voltage, said analog voltage and said second voltage constituting the output of said generating means.

11. A curve tracer as defined in claim 5 wherein said modifying means comprises means for attenuating said first and second reference signals in accordance with said instructions.

12. A curve tracer as defined in claim 5 wherein said modifying means comprises a pair of digital-to-analog converters connected to use said first and second reference signals as references, and to use said instructions as digital inputs.

13. A curve tracer as defined in claim 5 wherein said instruction providing means comprises (A) a memory for storing instructions, each of said instructions including (1) a first byte representing the initial coordinate of a line, and (2) a second byte representing the terminal coordinate of said line;

(B) first and second registers for storing said instruction bytes prior to their transfer to said modifying means;

(C) means for generating timing signals, and (D) means responsive to said timing signals for transferring successive ones of said bytes from said memory alternately to said first and second registers.

14. A curve tracer as defined in claim 13

(A) wherein (1) the coordinates of the beginning of the initial line in each symbol are referenced from the same coordinate, and (2) the coordinates of the remaining lines in each symbol are expressed relative to said initial coordinate of that symbol, and (B) wherein said instruction providing means further includes (1) a third register for storing successive ones of said instruction bytes prior to their delivery to said transfer means;

(2) a fourth register;

(3) means responsive to a symbol start signal for applying the byte stored in said third register to said fourth register;

(4) means for generating a symbol start signal when said first byte of the initial line in each symbol is contained in said third register so that only said first byte is applied to said fourth register, and (5) means for adding the contents of said third and fourth registers, the output of said adding means (a) being applied to said transfer means, and (b) representing said coordinates measured absolutely.

15. A curve tracer as defined in claim 13 and further including means for initiating said reference signal sweeps after said first and second bytes of each said instruction have been applied to said pair of registers in response to said timing signals, said sweeps being completed prior to the next succeeding one of said timing signals.

16. A curve tracer for tracing curves between selected points on an electronic display, said tracer comprising (A) means for providing instructions for tracing curves;

(B) means for generating a first reference signal which varies as a first trigonometric function with time;

(C) means for generating a second reference signal which varies as a second trigonometric function with time;

(D) means for modifying said first and second reference signals in accordance with said instructions so as to develop a pair of electrical analogs of said instructions which vary with time;

(E) means for combining said analogs so as to provide a time-varying deflection signal; and (F) means for tracing curves in accordance with said deflection signal between said selected points on said electronic display.

17. A curve tracer as defined in claim 16 further comprising (A) second means for modifying said first and second reference signals in accordance with said instructions so as to develop a second pair of electrical analogs which vary with time;

(B) second means for combining said second pair of analogs so as to provide a second time-varying deflection signal; and (C) wherein said means for tracing curves includes means for tracing curves in accordance with said second deflection signal in a direction angled to the direction of deflection resulting from said other deflection signal.

18. A curve tracer as defined in claim 17 wherein said curves are circular in shape.

19. A curve tracer as defined in claim 17 wherein said curves are elliptical in shape.

20. A curve generator for tracing symbols in a display, said generator comprising (A) means for providing first and second reference signals which sweep oppositely with time between maximum and minimum values;

(B) means for attenuating said reference signals in accordance with instructions representing initial and terminal coordinates so as to produce a pair of time-varying electrical analogs of those instructions;

(C) means for summing said pair of analogs so as to produce a deflection signal which varies with time from the electrical analog of said instruction attenuating the one of said reference signals varying from said maximum value to said minimum value, to the analog of said instruction attenuating the other of said reference signals;

(D) means for tracing a line in accordance with said deflection signal; and wherein the improvement comprises (E) switch means coupled to said means for attenuating so that the instruction representing the terminal coordinate of a first symbol and the instruction representing the initial coordinate of a succeeding contiguous symbol attenuate the same reference signal.

21. A curve generator as defined in claim 20

(A) including a cathode ray tube, having a screen;

(B) wherein said tracing means comprises means projecting an electron beam on said screen, and (C) further including means for unblanking said tube during said reference signal sweeps.

22. A curve generator comprising (A) a memory for storing instructions to trace symbols made up of array of lines, each of said instructions including (1) a first byte corresponding to the initial coordinate of a symbol, and (2) succeeding bytes corresponding to the terminal coordinates of successive lines making up said symbol;

(B) first and second registers for temporarily storing said instruction bytes;

(C) means for generating a start signal just prior to the tracing of a symbol;

(D) means responsive to said start signal for transferring said first byte from said memory to said first register;

(E) means for generataing first timing signals upon the occurrence of said start signal;

(F) means responsive to said first timing signals for transferring said successive bytes from said memory alternately to said second and said first registers;

(G) means for generating second timing signals when said bytes are contained in both said first and second registers;

(H) means for producing first and second time-varying reference signals in response to said second timing signals, said first and second reference signals (1) sweeping approximately linearly with time;

(2) sweeping in opposite directions from a selected maximum value to a selected minimum value and from said minimum value to said maximum value respectively, and (3) sweeping so that the algebraic sum of said reference signals is a constant over said sweeps;

(I) means for modifying said first reference signal in accordance with the contents of said first register;

(J) means for modifying said second reference signal in accordance with the contents of said second register, so as to develop a pair of electrical analogs of said instruction bytes which vary with time between maximum and minimum values;

(K) means for summing said analogs so as to provide a linear deflection signal, and (L) means for tracing symbols in accordance with said deflection signal;

(M) means for generating a stop signal after the tracing of each symbol, and (N) means responsive to said stop signal for disabling said reference signal producing means.

23. A curve generator as defined in claim 22 wherein (A) said instructions include also first and second control bytes;

(B) said start signal generating means comprises a first decoder for sensing said first control bytes and emitting a start signal in response thereto, and (C) said stop signal generating means comprises a second decoder for sensing said second control bytes and emitting a stop signal in response thereto.

24. The method as defined in claim 12 wherein the reference signals are provided so that they vary with time at a rate inversely proportional to the length of the symbol to be traced.

25. A curve tracer as defined in claim 8 wherein said slopes of said reference signals are inversely proportional to the length of the symbols to be traced.

26. A curve tracer as defined in claim 5 further comprising (A) second means for modifying said first and second reference signals in accordance with said instructions so as to develop a second pair of electrical analogs of said instructions which vary with time between maximum and minimum values;

(B) second means for summing said second pair of analogs so as to provide a second time-varying deflection signal, and (C) wherein said means for tracing symbols includes means for tracing symbols in accordance with said second deflection signal in a direction angled to the direction of deflection resulting from said other de-deflection signal.

27. A curve tracer comprising (A) means for providing instructions for tracing symbols;

(B) means for generating first and second reference signals which sweep with time between maximum and minimum values, said means for generating comprising (1) a digital-to-analog converter, (2) a bidirectional counter, the contents of which are applied as an input to said converter whereby said converter produces an analog voltage which is proportional to said contents, and (3) means for generating a second voltage which varies inversely with said analog voltage, said analog voltage and said second voltage constituting the output of said generating means;

(C) means for modifying said first and second reference signals in accordance with said instructions so as to develop a pair of electrical analogs of said instructions which vary with time between maximum and minimum values;

(D) means for summing said analogs so as to provide a time-varying deflection signal; and (E) means for tracing symbols in accordance with said deflection signal.

References Cited

UNITED STATES PATENTS

| | | | |
|---|---|---|---|
| 3,320,409 | 5/1967 | Larrowe. | |
| 2,931,936 | 4/1960 | Burgett | 340—324.1 |
| 2,962,625 | 11/1960 | Berwin et al. | 340—324.1 |
| 2,980,332 | 4/1961 | Brouillette et al. | 340—324.1 |
| 3,305,843 | 2/1967 | Scuitto | 340—172.5 |
| 3,345,625 | 10/1967 | Russell et al. | 340—324 |
| 3,380,028 | 4/1968 | Gustafson et al. | 340—172.5 |
| 3,389,404 | 6/1968 | Koster | 340—172.5 |

PAUL J. HENON, Primary Examiner

RONALD F. CHAPURAN, Assistant Examiner

U.S. Cl. X.R.

340—324